Patented Sept. 13, 1938

2,129,925

UNITED STATES PATENT OFFICE 2,129,925

PAINT COMPOSITION

Henry A. Gardner, Washington, D. C., assignor to The Titanium Alloy Manufacturing Company, New York, N. Y., a corporation of Maine No Drawing. Application June 12, 1935, Serial No. 26,239

2 Claims. (Cl. 134—45)

My invention relates to improved compositions of matter having non-chalking properties and comprising more or less definite amounts of a pigment of the zirconium class dispersed in more or less definite amounts of a binding material.

I have discovered that if zircon in powdered form is ground in linseed oil or other organic media used in paint, varnish and lacquer compositions, the steel rolls or steel plates through which the mixture passes rapidly become abraded. This injurious effect is due to the abrasive nature of zircon, no matter how finely divided the material is produced that is thereafter ground with the oil or other organic media. Even with zircon that has been powdered to such an extent that it will entirely pass a 325 mesh screen, the particles still maintain a great abrasive action on the steel rolls or plates of any grinding apparatus. As a result, the steel rolls of mills through which such mixtures containing zircon particles are passed would be ruined in a relatively short period of time. Moreover, the resulting paint that is produced in such fashion takes on a dark gray color, due to the entrained iron and steel particles that are removed from the grinding surfaces of the mill. This method of preparing dispersed zircon in binding materials is therefore impractical.

As a result of a physical study of the particles of finely ground zircon, I have found that this material may be so prepared that grinding in linseed oil or other liquid media is not necessary. I have found that the particles under certain conditions of rapid agitation without any grinding will become wetted by oil by merely mixing them with the oil media, and that a very smooth paint may thereby be produced by this process without the necessity of any grinding operations.

The process of preparing the zircon mineral so that it will have the unique physical properties I have just referred to is described in two pending applications for patent of Charles J. Kinzie, Serial No. 673,322, filed May 27th, 1933, and Serial No. 678,721, filed July 1, 1933. The first-mentioned method consists essentially in mechanically separating the free silica and part of the remaining iron, titanium and other impurities from the lixiviated product of U. S. Letters Patent to Barton & Kinzie No. 1,451,004 of April 10, 1923, which results in an improved zirconium silicate having approximately the following mineralogical composition:—

|  | Per cent |
|---|---|
| $SiO_2$ | 32.61 |
| $ZrO_2$ | 66.00 |
| $TiO_2$ | 0.15 |
| $Fe_2O_3$ | 0.10 |
| $Al_2O_3$ etc. | 1.14 |
|  | 100.00 |

The second method set forth in the Kinzie application Serial No. 678,721 comprises finely milling the refined zircon of either Patent No. 1,451,004 or the zirconium silicate described in application Serial No. 673,322, and then heating this milled zircon with a limited amount of carbon in the presence of a halogen gas, such as chlorine, in an amount in excess of that required to reduce and volatilize the impurities, including substantially all the iron and titanium, but without affecting the thereby purified zirconium silicate which consists of more than 99% $ZrSiO_4$ of particle fineness less than 0.044 mm., pure white in color, and which also contains less than 0.05% each of titanium and iron compounds with no free silica therein. Some of these refined zircons contain less than 0.03% of iron compounds with no titanium or other discolorative impurities.

I have found that zircons produced by the above methods described by Charles J. Kinzie have peculiar physical properties not apparent in ordinary zircon. In other words, they have the property of exerting a polar attraction toward certain liquids and become easily wetted when in contact therewith. Their surfaces adsorb with extreme ease certain definite amounts of linseed oil, and so become wetted without any pressure. These outstanding characteristics of such zircons as have been produced by the above methods make it possible to utilize them in the following manner.

In preparing a suitable composition for use in exterior house paints, I merely mix together approximately 80 parts by weight of this finely-ground refined zircon or zirconium silicate that will pass a 325 mesh screen and 20 parts by weight of linseed oil or other oils which form films when exposed to the air. By merely mixing these ingredients together in the customary paint stirring mixer (not a grinder) for a period of about 10 minutes, with rapid stirring, a smooth, uniform paste is obtained. The particles of the finely-divided zircon have a direct attraction for the oil as hereinbefore described, and are easily wetted with this stirring treatment.

I have found, as a result of extensive exposure tests, that as low as 5 parts by weight of this zircon paste, when added to 95 parts by weight of any exterior paint, will greatly improve such paint from the standpoint of color retention.

My process of preparing such compositions for actual use is as follows: I first select any exterior paint, such as white lead in oil, lead and zinc, lead, zinc and titanium, or other compositions which are used as house paints and which have been gound and are ready to apply.

Such exterior paints, for example, may contain for purposes of illustration:—(A) White lead 70%, linseed oil 20% and turpentine and drier 10%; or (B) white lead 40%, zinc oxide 20%, linseed oil 32% and turpentine or drier 8%; or (C) white lead 15%, titanium oxide 40%, linseed oil 38%, and turpentine and drier 7%. To 100 parts by weight of any such paint I add 7 parts by weight of the zircon paste which I have described and then agitate and stir the mixture for 1 or 2 minutes in the usual paint mixer to secure a smooth, uniform mass. When such paint is applied, it will result in a hard film that is immensely more durable than the same paint without the zircon addition.

In the same manner, the zircon paste may be added to enamels which usually consist of oleoresinous varnishes pigmented with desirable pigments and colors. In order to extend the life of these, I proceed in the same manner as I have described for the exterior paints, but I find that as low as 5 parts by weight of the zircon paste is sufficient to treat 100 parts by weight of the exterior enamel.

In similar fashion, I have been able to extend greatly the life of nitrocellulose lacquers such as are now applied to the surfaces of automobiles, refrigerators, and other mechanical equipment. At the present time these lacquers in white or light tints are usually made almost entirely of high strength titanium pigments in order to secure the greatest whiteness and hiding power. However, because of the rapid chalking characteristics of titanium oxide, such exterior lacquers may chalk rapidly, and, if tinted, they will show fading in a relatively short period of time.

I have now discovered through extensive exterior exposure tests that these defects can be almost overcome through the addition of the improved easy wetting zircon hereinbefore described.

I prefer, however, in the case of lacquers not to add the zircon in the form of a linseed oil paste. My preferred method is to add the zircon to the nitrocellulose lacquer in the form of a paste produced with a lacquer plasticizer selected from plasticizers such as dibutyl phthalate, diethyl phthalate, ethyl abietate, ethyl benzoate, tricresyl phosphate, triphenyl phosphate, castor oil, methyl-, ethyl- and butyl-recinoleates, or similar substances which have heretofore been employed as plasticizing materials for nitrocellulose compositions.

For the preparation of this lacquer paste, I add 65 parts by weight of the properly ground and treated zircon to 35 parts by weight of the plasticizer, and agitate the mixture rapidly for a sufficient period of time to give good dispersion resulting in a soft, smooth paste. No grinding is employed. In using this paste in lacquers, I generally add from 5 to 10 parts thereof to 100 parts of the finished lacquer. This quantity is usually sufficient to give the non-chalking and tint retention properties which I have found it to possess.

I have also produced a lacquer paste pigment by suspending 20 parts by weight of zircon in 100 parts of a water-wet nitrocellulose. By adding alcohol to the mass the water is withdrawn, and the resulting paste consisting of zircon, nitrocellulose and alcohol is produced. This may be stirred into ordinary lacquer to impart thereto the desired properties I have mentioned.

I claim as my invention:

1. A paint paste consisting of about 80% finely-divided and refined zirconium silicate comprising essentially unconverted $ZrSiO_4$ containing less than 0.20% each of titanium and iron compounds, the particles of which will pass a 325 mesh screen, intimately associated and wetted by agitation with linseed oil about 20%.

2. A paint paste consisting of about 80% finely-divided and purified but undecomposed zirconium silicate ($ZrSiO_4$) more than 99% and containing less than 0.05% each of titanium and iron compounds with no free silica, and of particle size less than 0.044 mm., said particles having become intimately associated and wetted by agitation with linseed oil about 20%.

HENRY A. GARDNER.